(No Model.)

M. DUDLEY.
SOLE EDGE FINISHER.

No. 251,032. Patented Dec. 20, 1881.

Witnesses.
S. N. Piper.
E. A. Pratt.

Inventor.
Myrick Dudley.
by R. H. Eddy, atty.

N. PETERS. Photo-Lithographer, Washington, D. C.

UNITED STATES PATENT OFFICE.

MYRICK DUDLEY, OF LYNN, MASSACHUSETTS, ASSIGNOR TO HIMSELF AND RUEL R. NICKERSON, OF SAME PLACE.

SOLE-EDGE FINISHER.

SPECIFICATION forming part of Letters Patent No. 251,032, dated December 20, 1881.

Application filed October 21, 1881. (No model.)

*To all whom it may concern:*

Be it known that I, MYRICK DUDLEY, of Lynn, in the county of Essex and State of Massachusetts, have invented a new and useful Improvement in Sole-Edge Finishers; and I do hereby declare the same to be described in the following specification and represented in the accompanying drawings, of which—

Figure 1:
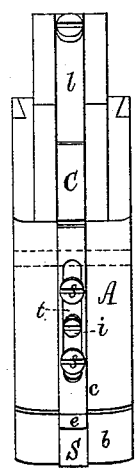
Figure 2:
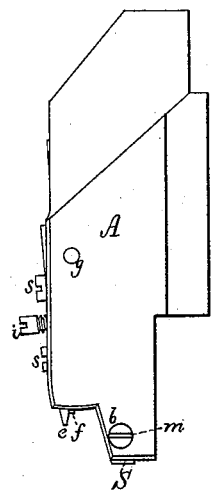
Figure 3:
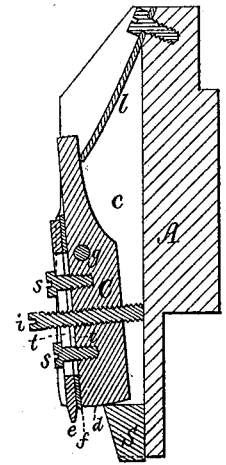
Figure 4:
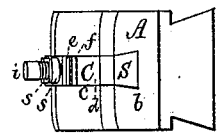

Figure 1 is a front elevation, Fig. 2 a side view, Fig. 3 a longitudinal section, and Fig. 4 a bottom view, of a sole-edge finisher embodying my present invention, the nature of which is defined in the claims hereinafter presented.

The sole-edge finisher shown in such drawings has within its head A a separate adjustable block, C, which, disposed within a chamber, c, in the said head, is pivoted to the head, the pivotal pin being shown at g. This adjustable block has, besides its burnishing-surface d, a guide-lip, e, and an edge-molder, f, which, separate from the block, are adjustable relatively to the surface d thereof, the lip e and molder f being parts of pieces of metal, slotted lengthwise, and secured to the block C by screws s s, which go through their slots t t and screw into the block. Sometimes I make the block C and the edge-molder f in one piece of metal, in which case the said edge-molder would not be adjustable, but would be stationary relatively to the block C, the lip e being separate from the block and adjustable. By applying the lip e and molder f in manner as described to the block C each may be properly adjusted to project from the burnishing-surface d of the block any required distance, as wear of them or the block or circumstances may from time to time require.

Within the head A a spring, l, arranged as shown, is fixed, and bears upward against the tail of the block C. A screw, i, screwed into and through the block C in advance of its pivotal pin g, serves, with the said spring, to effect movements of the block on the said pin, in order to vary the distance between the lip e and the guide-lip b projecting from the head, as shown. This guide-lip b is channeled or grooved lengthwise to receive a movable slide, S, held in place by a set-screw, m, screwed into the lip b and against the slide. As the part C may become worn or ground down on its working end, the slide S may be moved up thereto, so as to maintain a close joint between the two, the outer face of the slide being to bear against the sole while the edge-finisher may be in use.

I do not herein claim the block C as pivoted to the head A and provided with an adjusting-screw and spring, arranged as described in Letters Patent No. 246,944, granted on an invention made by me, the spring in such case being a spiral one and disposed on the screw and with it, arranged on one and the same side of the pivot of the block, whereas in my present combination the spring and screw are on opposite sides of the pivot, and are separate from each other, thus rendering a nut to the screw unnecessary, and bringing the screw to the front of the edge-finisher, where access to it to operate it can be had with more convenience.

What I claim as my invention in the sole-edge finisher is as follows, viz:

1. The combination of the head A or its adjustable block C with the adjusting-screw i and spring l, disposed on opposite sides of the pivotal pin of and relatively to the said block and head, as set forth.

2. The combination of the block C with the guide-lip e, adjustable relatively to the burnishing-surface d of said block, as in manner set forth.

3. The combination of the block C with the guide-lip e and the edge-molder f, separate from and applied to such block, so as each to be adjustable relatively to its burnishing-surface d, as set forth.

4. The combination of the adjustable slide S, arranged in the lip b, with the head A, provided with such lip, and with the block C, arranged with the lip, and having the burnishing-surface d, guide-lip e, and edge-molder f, all being substantially as set forth.

MYRICK DUDLEY.

Witnesses:
R. H. EDDY,
S. N. PIPER.